United States Patent
Chen et al.

(10) Patent No.: US 7,286,846 B2
(45) Date of Patent: Oct. 23, 2007

(54) SYSTEMS AND METHODS FOR PERFORMING OUTER LOOP POWER CONTROL IN WIRELESS COMMUNICATION SYSTEMS

(75) Inventors: Tao Chen, San Diego, CA (US); Stein Lundby, Solana Beach, CA (US); Sandip Sarkar, San Diego, CA (US); Yu-Cheun Jou, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 805 days.

(21) Appl. No.: 10/652,355

(22) Filed: Aug. 29, 2003

(65) Prior Publication Data

US 2004/0162099 A1 Aug. 19, 2004

Related U.S. Application Data

(60) Provisional application No. 60/470,770, filed on May 14, 2003, provisional application No. 60/452,790, filed on Mar. 6, 2003, and provisional application No. 60/448,269, filed on Feb. 18, 2003.

(51) Int. Cl.
*H04B 7/00* (2006.01)

(52) U.S. Cl. .................... 455/522; 455/69; 455/452.2; 370/318; 370/252

(58) Field of Classification Search ................ 455/522, 455/69, 452.1, 452.2; 714/18; 370/318, 252
See application file for complete search history.

(56) References Cited

U.S. PATENT DOCUMENTS

| | | | |
|---|---|---|---|
| 6,836,666 B2 * | 12/2004 | Gopalakrishnan et al. | 455/452.2 |
| 2002/0191570 A1 * | 12/2002 | Kim et al. | 370/335 |
| 2003/0050086 A1 * | 3/2003 | Lee et al. | 455/522 |

* cited by examiner

*Primary Examiner*—Nick Corsaro
*Assistant Examiner*—Alan T. Gantt
(74) *Attorney, Agent, or Firm*—Philip R. Wadsworth; Thien T. Nguyen; S. Hossain Beladi

(57) ABSTRACT

Systems and methods for controlling the power level for a mobile station during periods when no data is being transmitted by the mobile station. In one embodiment, data is intermittently transmitted from a mobile station to a base station on a reverse-link traffic channel. When data is being transmitted on the traffic channel, the transmitted data is used by the base station to perform power control operations (e.g., incrementing or decrementing the mobile station's power level, based upon comparison of a received SNR to a target SNR). When no data is being transmitted on the traffic channel, a "zero-rate indicator" is transmitted on the rate indicator channel. The zero-rate indicator is used by the base station to perform power control. Power control based on the zero-rate indicator may use velocity profiles, reliability metrics or other techniques to control adjustment of the power level.

45 Claims, 7 Drawing Sheets

SYSTEMS AND METHODS FOR PERFORMING OUTER LOOP POWER CONTROL IN WIRELESS COMMUNICATION SYSTEMS

This application claims benefit of U.S. Provisional Pat. Appl. Ser. No. 60/448,269, Jan. 18, 2003 Ser. No. 60/452,790, filed on Mar.06, 2003, Ser. No. 60/470,770, filed on May, 14, 2003.

BACKGROUND

1. Field of the Invention

The invention relates generally to the field of telecommunications, and more particularly to mechanisms for providing outer loop power control in a wireless communication channel when data is intermittently transmitted over the channel.

2. Related Art

Wireless communication technologies are rapidly advancing, and wireless communication systems are utilized to provide a larger and larger portion of the communications capacity that is currently available to users. This is true despite the additional technological impediments that are faced in implementing a wireless communication system, as compared to a wireline system. For instance, wireless communication systems must deal with issues relating to power control between a base station and its mobile stations in order to maximize the performance of the system, whereas a wireline system does not.

One type of wireless communication system comprises a cellular CDMA (code division multiple access) system which is configured to support voice and data communications. This system may have multiple base stations which communicate via wireless channels with multiple mobile stations. (The base stations are also typically coupled via wireline networks to various other systems, such as a public switched telephone network.) Each base station communicates with a set of mobile stations that are within a sector corresponding to the base station. This base station is responsible for controlling power in communications between the base station and the mobile stations in order to minimize interference and maximize throughput, as well as enabling the mobile stations to conserve energy and thereby extend the amount of time during which they can be used.

Power control between the base station and a mobile station in this type of system is typically based upon an error rate associated with communications between the base station and the mobile station. The goal of power control is to control the transmitter's power such that transmitted data is decoded with a constant quality level. One measure of quality is the frame error rate, which is the fraction of transmitted data frames that are received in error. Ideally, the mobile station transmission power is adjusted to a level that results in the desired predetermined frame error rate. To do this, the power control typically has two loops: the inner-loop and the outer-loop. The inner-loop regularly measures the signal-to-noise ratio (SNR) at the base-station and compares it to a target SNR. This measurement may be performed on any channel or combination of channels that can be used as a power reference. For example, in cdma2000 this measure is typically done on the reverse link pilot channel (R-PICH). The result of the comparison is used to generate a power control command, which is relayed to the mobile station. For example, if the SNR measured at the base-station is below the target SNR the inner-loop will issue a command instructing the mobile station to increase its transmission power, and if the SNR measured at the base-station is above the target SNR the inner-loop will issue a command instructing the mobile station to decrease its transmission power. The outer-loop regularly updates the target SNR based on an estimate of the current decoding quality. For example, the outer-loop may increase the target SNR by 1 dB each time a frame is incorrectly decoded, and decrease the target SNR by 0.01 dB each time a frame is correctly decoded. In this manner, the target SNR for the inner-loop is adjusted to a level at which the predetermined, acceptable error rate is maintained.

While this type of power control algorithm is suitable for channels over which data is continually being transmitted, it is less well-suited to channels which are used intermittently. The problem in this situation is that, put very simply, there are periods during which there are no data frames that can serve as the basis for adjusting the target SNR. Although the inner-loop may operate on a signal that is continuously transmitted such as the R-PICH, the outer-loop does not have any signal to update the target SNR. In other words, when frames are being transmitted, errors in the frames can be identified, and the target SNR can be adjusted to achieve the desired error rate, but when no frames are being transmitted, there is no way to tell whether the target SNR should be adjusted upward or downward. Consequently, following a period during which no frames of data are transmitted, the target SNR level may not be set at the optimal level, and therefore the inner-loop may not be instructing the mobile station to transmit at the optimal power level. If the level is set too low, the frames that are initially transmitted are almost guaranteed to have errors. On the other hand, if the power level is too high, power is wasted and unnecessary interference is generated, potentially causing errors in the transmissions of other mobile stations. It would therefore be desirable to provide a mechanism through which a preferred target SNR level can be achieved in the absence of data transmissions.

SUMMARY

One or more of the problems outlined above may be solved by the various embodiments of the invention. Broadly speaking, the invention comprises systems and methods for controlling the power level for a mobile station during periods when no data is being transmitted by the mobile station.

In one embodiment, a wireless communication system includes a base station and one or more mobile stations that communicate via corresponding wireless communication links. Each link has multiple channels, including both forward link channels for transmitting data from the base station to the mobile station, and reverse link channels for transmitting data from the mobile station to the base station. One of the reverse-link traffic channels is used only intermittently (i.e., during some periods, data is transmitted on the channel, and during other periods, no data is transmitted). When data is being transmitted on the traffic channel, the transmitted data is used by the base station to perform power control operations (e.g., incrementing or decrementing the base station's target SNR level, based upon errors in the received data). When no data is being transmitted on the traffic channel, a "zero-rate indicator" is transmitted on the rate indicator channel. In this situation, the zero-rate indicator is used by the base station to perform outer-loop power control and update the target SNR. It should be noted that, when data is being transmitted on the traffic channel, corresponding rate indicators are transmitted on the rate indicator channel, but these rate indicators are not used for power control.

An alternative embodiment of the invention comprises a method for providing power control in a wireless communication system having a base station and a mobile station coupled by a reverse-link traffic channel in a reverse-link rate indicator channel. The method of this embodiment comprises: when traffic is being transmitted on the reverse-link traffic channel, transmitting a rate indicator signal corresponding to a rate of the traffic being transmitted on the reverse-link traffic channel on the reverse-link rate indicator channel, and controlling a target SNR for the outer-loop of this mobile station based on the traffic being transmitted on the reverse-link traffic channel; and when traffic is not being transmitted on the reverse-link traffic channel, periodically transmitting a zero-rate indicator on the reverse-link rate indicator channel and controlling the target SNR based on the zero-rate indicator.

Numerous additional embodiments are also possible.

BRIEF DESCRIPTION OF THE DRAWINGS

Various aspects and features of the invention are disclosed by the following detailed description and the references to the accompanying drawings, wherein.

Figure 1:
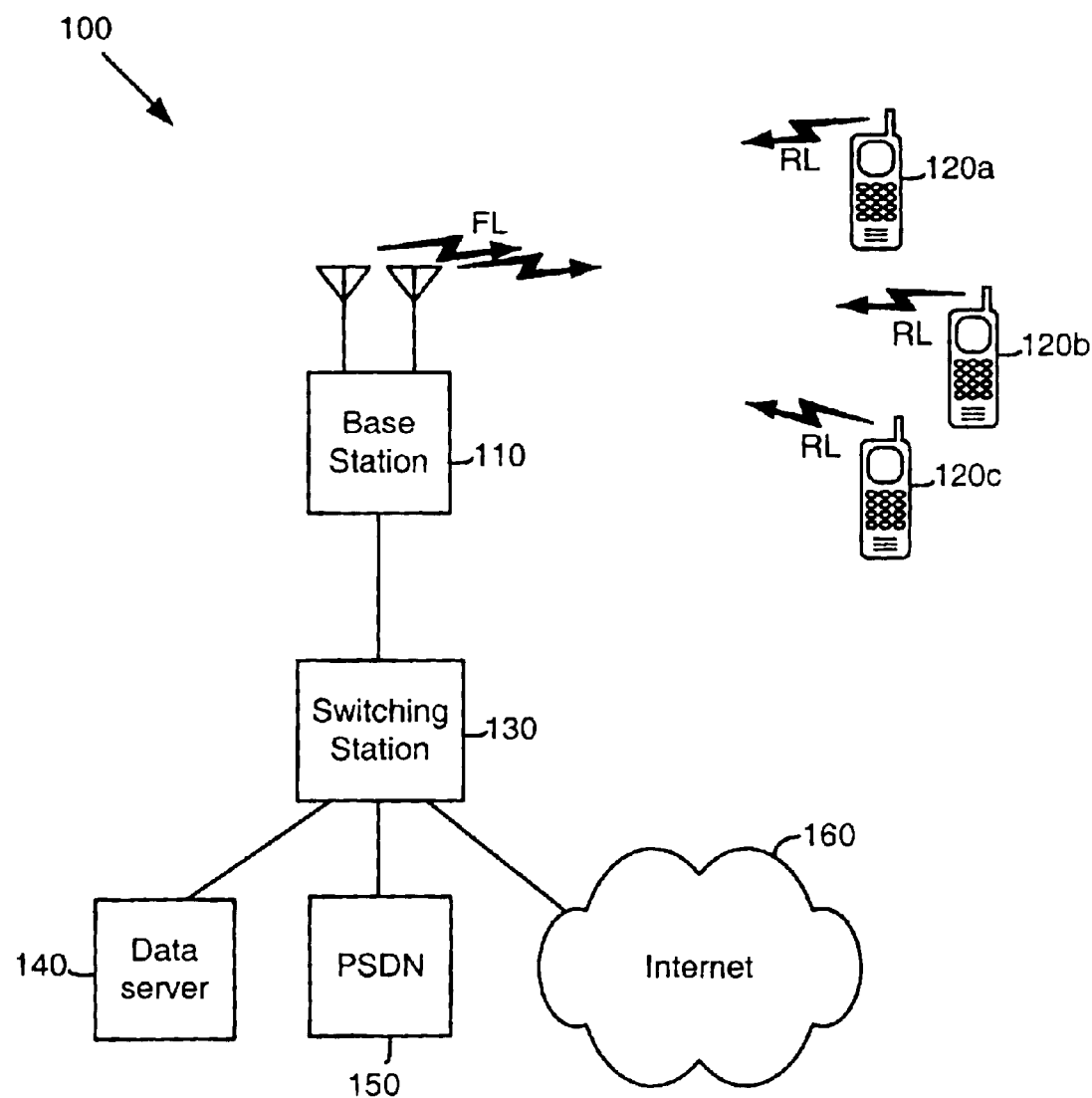
FIG. 1 is a diagram illustrating the structure of an exemplary wireless communications system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for controlling the power level for a mobile station during periods when no data is being transmitted by the mobile station. As indicated above, power control in wireless communication systems is typically based upon a signal to noise ratio (SNR) and an error rate associated with received frames. Often, the power level of a mobile station is controlled by directing the mobile station to increment its power level when the received SNR falls below a target SNR, and to decrement its power level when the received SNR is above the target SNR. The target SNR is similarly incremented when a frame received by a base station from the mobile station contains errors, and decremented when a frame is received from the mobile station without errors.

In one embodiment of a wireless communication system, communications are carried on between the base station and the mobile station via multiple wireless communication channels. Some of these channels carry continuous data traffic (e.g., frames of data), while others are utilized only intermittently. One of the intermittent-use channels comprises a reverse-link enhanced supplemental channel (R-ESCH). The R-ESCH is used in conjunction with a reverse-link rate indicator channel (R-RICH). When data frames are transmitted over the R-ESCH, a corresponding indicator of the rate at which the data is transmitted on the R-ESCH is transmitted over the R-RICH. Conventionally, when no data is being transmitted over R-ESCH, no rate indication information is transmitted over R-RICH. In one embodiment of the present invention, when no data is being transmitted over the R-ESCH, a "zero-rate" indicator is transmitted over the R-RICH during a certain portion of the period during which the rate indication information is normally transmitted. For example, the "zero-rate" indicator may be transmitted during the first the five milliseconds of the 20 millisecond frame period. The "zero-rate" indicator is used by the base station to determine the power level that should be used by the mobile station. Thus, as the fading characteristics of the mobile station change, the base station maintains an awareness of the fading characteristics via the "zero-rate" indicator and is therefore able to determine inappropriate power level for the mobile station, even though no data is being transmitted by the mobile station.

In one embodiment, the R-ESCH may be used to transmit data from a mobile station to the base station in either a scheduled mode or an autonomous mode. In this embodiment, transmissions which are made in either mode employ the type of power control algorithm described above. In other words, when no data is being transmitted, a "zero-rate" indicator is periodically transmitted to the base station to enable the base station to determine the decoding quality of the received signal and to update the currently suitable target SNR for the power control outer-loop. Then, when a data transmission begins, the target SNR of the outer-loop is appropriately set. In either mode, once the data transmission has begun, control of the power control target SNR level may be managed conventionally (i.e., by incrementing or decrementing the target SNR, depending upon whether frames are received with or without errors).

In an alternative embodiment, the power control methodology described above may be used in the autonomous mode, while transmissions which are made in the scheduled mode utilize a different methodology. For example, in the scheduled mode, the data transmissions may be made at a predetermined target SNR which is sufficiently high to ensure, with reasonable certainty, that the frames at the beginning of the transmission will be received without errors. In this embodiment, control of the power control target SNR level may be managed conventionally by incrementing or decrementing the level based on frame errors once the data transmission has begun.

A preferred embodiment of the invention is implemented in a wireless communication system that conforms generally to a release of the cdma2000 specification. cdma2000 is a 3rd Generation (3G) wireless communication standard that is based on the IS-95 standard. The cdma2000 standard has evolved and continues to evolve to continually support new services. The preferred embodiment of the invention is intended to be operable in systems utilizing Release D of the cdma2000 standard, but other embodiments may be implemented in other Releases of cdma2000 or in systems that conform to other standards (e.g., W-CDMA). The embodiments described herein should therefore be considered exemplary, rather than limiting.

Referring to FIG. 1, a diagram illustrating the structure of an exemplary wireless communications system is shown. As depicted in this figure, system 100 comprises a base station 110 that is configured to communicate with a plurality of mobile stations 120. Mobile stations 120 may, for example, be cellular telephones, personal information managers (PIMs or PDA), or the like that are configured for wireless communication. It should be noted that these devices need not actually be "mobile," but may simply communicate with base station 110 via a wireless link. Base station 110 transmits data to mobile stations 120 via corresponding forward link (FL) channels, while mobile stations 120 transmit data to base station 110 via corresponding reverse link (RL) channels.

It should be noted that, for the purposes of this disclosure, identical items in the figures may be indicated by identical reference numerals followed by a lowercase letter, e.g., 120a, 120b, and so on. The items may be collectively referred to herein simply by the reference numeral.

Base station 110 is also coupled to a switching station 130 via a wireline link. The link to switching station 130 allows base station 110 to communicate with various other system components, such as a data server 140, a public switched telephone network 150, or the Internet 160. It should be noted that the mobile stations and system components in this figure are exemplary and other systems may comprise other types and other combinations of devices.

While, in practice, the specific designs of base station 110 and mobile stations 120 may vary significantly, each serves as a wireless transceiver for communicating over the forward and reverse links. Base station 110 and mobile stations 120 therefore have the same general structure. This structure is illustrated in FIG. 2.

Figure 2:
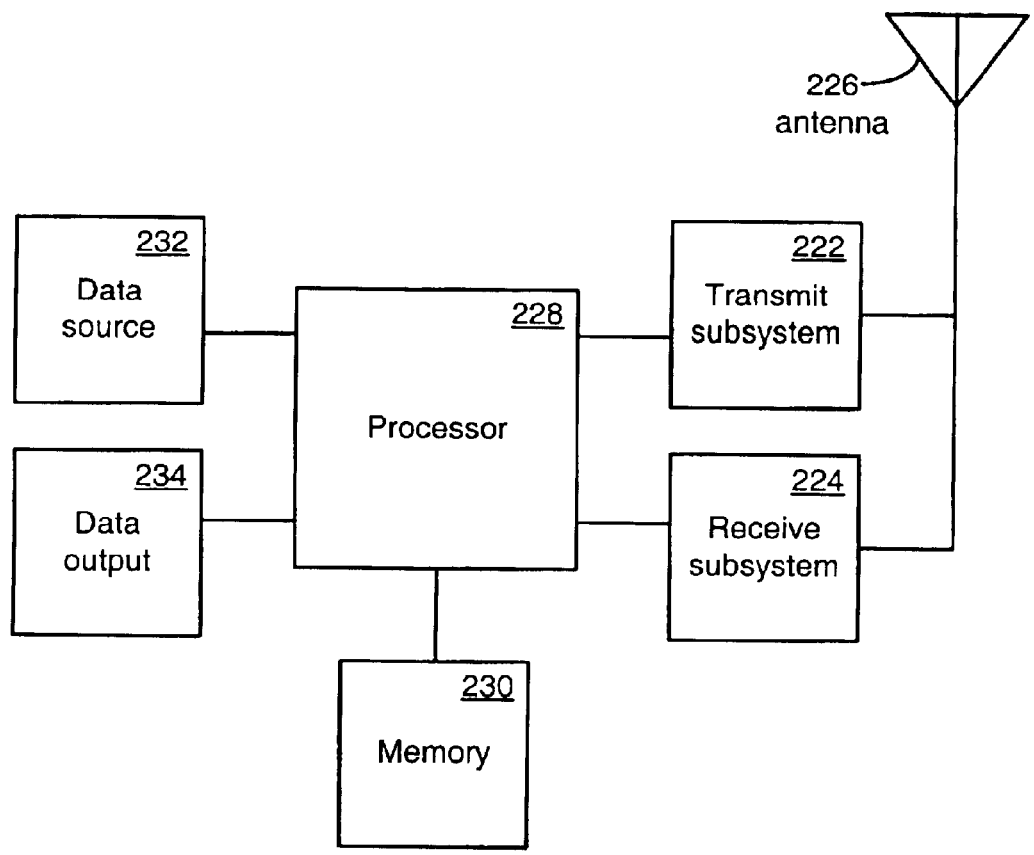
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and reverse links through antenna 226. Transmit subsystem 222 and receive subsystem 224 are also coupled to processor 228, which is configured to control transmit and receive subsystems 222 and 224. Memory 230 is coupled to processor 228 to provide working space and local storage for the processor. A data source 232 is coupled to processor 228 to provide data for transmission by the system. Data source 232 may, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

Persons of skill in the art of the invention will appreciate that the structure depicted in FIG. 2 is illustrative and that other embodiments may use alternative configurations. For example, processor 228, which may be a general-purpose microprocessor, a digital signal processor (DSP) or a special-purpose processor, may perform some or all of the functions of other components of the transceiver, or any other processing required by the transceiver. The scope of the claims appended hereto are therefore not limited to the particular configurations described herein.

Considering the structure of FIG. 2 as implemented in a mobile station, the components of the system can be viewed as a transceiver subsystem coupled to a processing subsystem, where the transceiver subsystem is responsible for receiving and transmitting data over wireless channel and the processing subsystem is responsible for preparing and providing data to the transceiver subsystem for transmission and receiving and processing data that it gets from the transceiver subsystem. The transceiver subsystem could be considered to include transmit subsystem 222, receive subsystem 224 and antenna 226. The processing subsystem could be considered to include processor 228, memory 230, data source 232 and data output 234.

Figure 3:
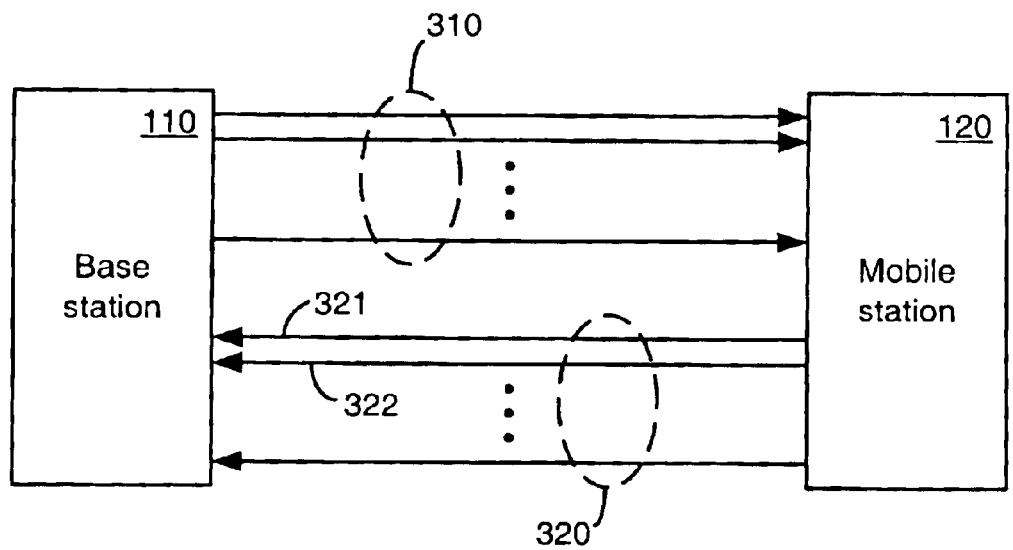
FIG. 3 is a diagram illustrating multiple channels between the mobile station and base station in accordance with one embodiment.

As indicated above, the communication link between the base station and the mobile station actually comprises various channels. Referring to FIG. 3, a diagram illustrating multiple channels between the mobile station and base station is shown. As depicted in the figure, Base station 110 transmits data to mobile station 120 via a set of forward link channels 310. These channels typically include both traffic channels, over which data is transmitted, and control channels, over which control signals are transmitted. Each of the traffic channels generally has one or more control channels associated with it. Forward link channels 310 may include, for example, a Forward Fundamental Channel (F-FCH) that may be used to transmit low-speed data, a Forward Supplemental Channel (F-SCH) that may be used for high-speed, point-to-point communications, or a Forward High-Speed Broadcast Channel (F-HSBCH) that may be used to broadcast messages to multiple recipients. The channels may also include a Forward Dedicated Control Channel (F-DCCH), a forward broadcast control channel (F-BCCH) or a Forward Paging Channel (F-PCH) that may be used to transmit control information relating to the traffic channels or to other aspects of the operation of the system.

Mobile station 120 transmits data to base station 110 via a set of reverse link channels 320. Again, these channels typically include both traffic channels and control channels. Mobile station 120 may transmit data back to the base station over such channels as a reverse access channel (R-ACH), an extended reverse access channel (R-EACH), a reverse request channel (R-REQCH), a reverse enhanced supplemental channel (R-ESCH), a reverse dedicated control channel (R-DCCH), a reverse common control channel (R-CCCH), or a reverse rate indicator channel (R-RICH). Two of these channels, the R-ESCH and the R-RICH (represented by reference numbers 321 and 322 in FIG. 3) are particularly noteworthy, as they are the channels in which the inventive power control mechanism is implemented in one embodiment.

In one embodiment, the R-ESCH is used to transmit high-speed data from the mobile station to the base station. Data can be transmitted over the R-ESCH at rates ranging from 9.6 kbps to 1228.8 kbps. The data is transmitted in 5 ms sub-frames. The general structure of the R-ESCH is illustrated in FIG. 4.

Figure 4:
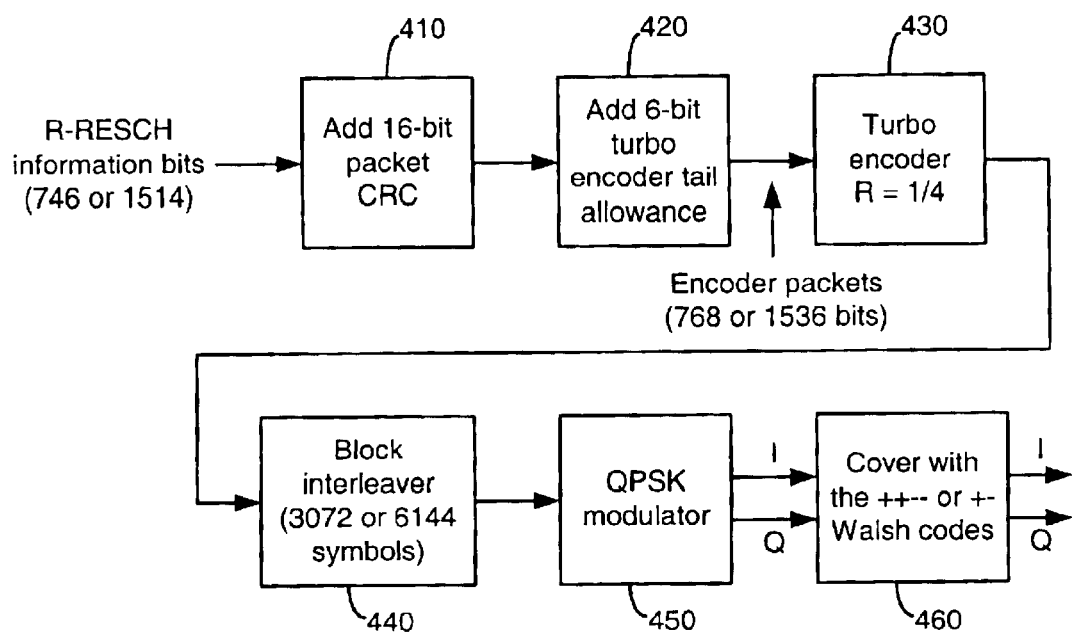
FIG. 4 is a functional block diagram illustrating the structure of a reverse-link enhanced supplemental channel (R-ESCH) for an encoder packet size of 768 or 1536 bits in accordance with one embodiment.

Referring to FIG. 4, a functional block diagram illustrating the structure of the R-ESCH for an encoder packet size of 768 or 1536 bits is shown. It should be noted that, in this embodiment, this structure will vary somewhat when used in conjunction with other packet sizes (192, 384, 2304, 3072, 4608 or 6144 bits). The structure may also vary in its implementation in other embodiments. The structure of FIG. 4 is merely exemplary of the possible structures.

As depicted in FIG. 4, a 16-bit packet CRC is first added in block 410 to the information bits that are to be transmitted. A 6-bit turbo encoder tail allowance is added in block 420, so that the packet now has a size of 768 or 1536 bits (corresponding to received packet sizes of 746 or 1514 bits, respectively). Turbo encoding (block 430) and block interleaving (block 440) are then performed on the packet. The resulting symbols are modulated (block 450) and covered with the Walsh codes (block 460). Because these operations are well understood by persons skilled in the art, they will not be described in further detail here.

The R-RICH is used by the mobile station to transmit a rate indicator that indicates the transmission format being used on the R-ESCH. A rate indicator is transmitted for every sub-packet transmitted on the R-ESCH. In one embodiment, the rate indicator comprises five bits. Three of the five bits indicate the packet size of the corresponding sub-packet on the R-ESCH. The correspondence between these bits and the packet size are shown below in Table 1.

TABLE 1

| Packet-size bits of rate indicator | Encoder packet size |
| --- | --- |
| 000 | 192 |
| 001 | 384 |
| 010 | 768 |
| 011 | 1536 |
| 100 | 2304 |
| 101 | 3072 |
| 110 | 4608 |
| 111 | 6144 |

The other two of the five bits of the rate indicator indicate the sub-packet identifier of the corresponding sub-packet on the R-ESCH. For example, in this embodiment, a packet is subdivided into four sub-packets of 5 ms each, so the sub-packet identifier indicates which of the four sub-packets (1, 2, 3 or 4) corresponds to the rate identifier. The correspondence between these bits and the sub-packet identifier are shown below in Table 2.

TABLE 2

| Sub-packet bits of rate indicator | Number (SPID) of sub-packet |
| --- | --- |
| 00 | 1 |
| 01 | 2 |
| 10 | 3 |
| 11 | 4 |

Figure 5:
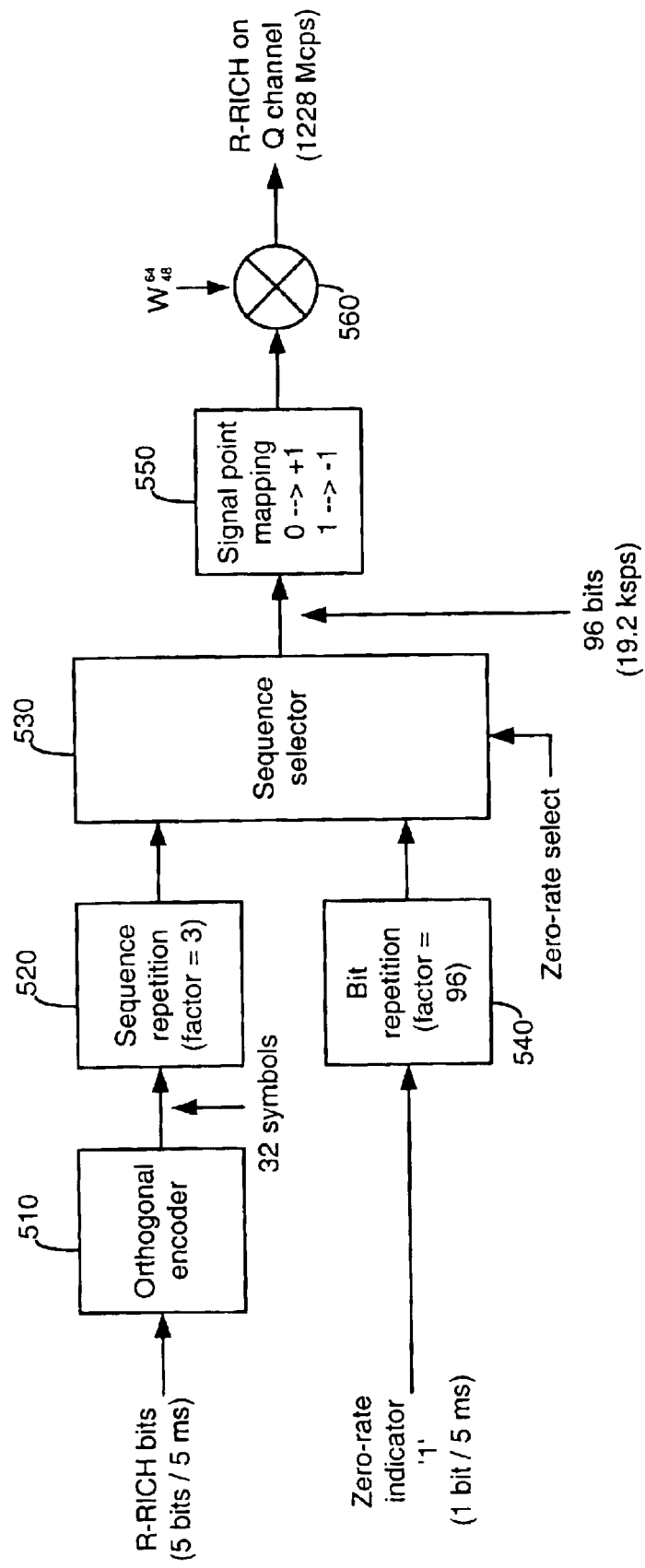
FIG. 5 is a functional block diagram illustrating the general structure of a reverse-link rate indicator channel (R-RICH) in accordance with one embodiment.

Referring to FIG. 5, a functional block diagram illustrating the general structure of the R-RICH for a preferred embodiment is shown. It should be noted that this structure is exemplary and may vary in other embodiments. As depicted in FIG. 5, the five bits of a rate indicator are first processed by the orthogonal encoder of block 510. Sequence repetition is then performed on the encoded symbols in block 520. Sequence selector 520 then selects either the encoded symbols or a zero-rate indicator, which will be explained in more detail below. Then, in block 550, signal point mapping is performed on the bits of the selected indicator (the actual rate indicator or the zero-rate indicator). The resulting signal is then covered with the appropriate Walsh codes (block 560). Because these operations are well understood by persons skilled in the art, they will not be described in further detail here.

As noted above, while data is being transmitted on the R-ESCH, power control is performed in the conventional manner. In other words, as the base station receives data from the mobile station, the base station determines whether the SNR of the received signal is above or below the target SNR. If the received SNR is above the target, the base station directs the mobile station to reduce its power level. If the received SNR is below the target SNR, the base station directs the mobile station to increase its power level. The target SNR is adjusted based upon whether received frames contain errors. If a frame contains errors, the target SNR is too low, and is therefore increased. If a frame does not contain errors, the target SNR is assumed to be at least a bit too high, and is therefore reduced. Typically, the step sizes by which both the mobile station's power level and the base station's target SNR are incremented are much greater than the step sizes by which they are decremented. For instance, the ratio of the increment step size to the decrement step size may be 100:1. Thus, for example, if errors are present in the received data, the power level is raised very quickly, but if no errors are present, the power level is decreased very slowly.

The problem that is encountered in using this methodology results from the fact that the R-ESCH may be used intermittently. In other words, data may be transmitted on this channel for a period of time, and then the channel may not be used for a while. When no data is being transmitted on the R-ESCH, it is not possible to detect transmission errors, and therefore not possible to increment and/or decrement the target SNR based upon such errors. The inner-loop may continue to update the transmission power based on a channel that is continuously present, but the target SNR may not be adjusted. Consequently, if the channel quality of the R-ESCH changes during a period in which no data is transmitted, the last-used target SNR may not be suitable when the next data transmission begins. If the target SNR is too high, the mobile station will expend power unnecessarily, and will generate unnecessary interference with other mobile stations' transmissions. If the target SNR is too low, the frames that are initially transmitted will contain too many errors to be of any use. Therefore, in a preferred embodiment, a zero-rate indicator is periodically transmitted on the R-RICH when no data is being transmitted on the R-ESCH, simply to provide a basis for outer-loop power control. It should be noted that the term "zero-rate indicator" is used herein to refer to any indicator that is transmitted when no data is being transmitted on the traffic channel, and is not limited to indicators that explicitly indicate a traffic channel data rate of zero.

In the embodiment illustrated in FIG. 5, the zero-rate indicator "1" is provided to bit repetition block 540, and the resulting bitstream is provided to sequence selector 530. If no data is being transmitted on the R-ESCH, a zero-rate signal input to sequence selector 530 is asserted, causing the zero-rate indicator to be selected. This indicator is processed in the same manner in which the rate indicator is processed when data is being transmitted on the R-ESCH.

While a zero-rate indicator could be transmitted all the time during which no data is transmitted on the R-ESCH, a preferred embodiment transmits zero-rate indicators in only a portion of the time for which no data is transmitted on the R-ESCH. For example, a 20 ms frame may be split into four 5 ms sub-frames. In a preferred embodiment, the zero-rate indicator is transmitted during only one of the four sub-frames, such as the first sub-frame.

When the zero-rate indicator is received by the base station, it is decoded, and the outcome of this decoding is used by the base station to determine whether the target SNR for the corresponding mobile station should be adjusted upward or downward. In one embodiment the target SNR is increased by 1 dB if the decoding fails, and the target SNR is decreased by 0.1 dB if the decoding succeeds. The base station selects the ratio of decrease to increase is based on the desired zero-rate indicator decoding error rate.

In one embodiment the mobile always transmits the rate indicator channel with the same traffic-to-pilot ratio, whether it is sending a zero-rate indicator or a non-zero rate indicator. The base station then estimates the decoding error rate on the rate-indicator channel when data is transmitted. It then uses this target error rate to set the increase and decrease values to be used to update the target SNR based on the zero-rate indicator. For example, the base station may count the number k of incorrectly decoded rate indicators during the last 100 sub-packets. When the mobile station does not transmit any data on the reverse link and transmits a zero-rate indicator, the base station may then increase the target SNR by 1 dB if decoding of the zero-rate indicator is in error, and decreasing the target SNR by $1/(100/k-1)$ dB if the decoding of the zero-rate indicator is successful. This ensures that the error rate of the zero-rate indicator will stay around k/100.

The received zero-rate indicator may be processed in a number of different ways. For example, the zero-rate indicator may be used to determine a velocity profile for the mobile station. This may be accomplished through the use of various techniques that are known in the art, such as a level-crossing technique. Once the velocity profile is determined, it may then be used to adjust the target SNR. Because the velocity of the mobile station toward or away from the base station induces a Doppler shift in the signals transmitted from the mobile station, the velocity degrades the receiver and decoder performance. If the velocity profile of the mobile station is known, the target SNR can be controlled to compensate for the resulting degradation.

The zero-rate indicator can also be processed in various other ways, such as by determining the energy density of the zero-rate indicator signal and comparing it to a pilot signal. Reliability metrics may also be used to determine the reliability of the zero-rate indicator signal. If the signal is determined to be reliable, then the SNR is considered to be sufficiently high, and the target SNR of the corresponding mobile station is therefore decremented. If the signal is determined not to be reliable, then the received power level of the rate indicator is too low, and the target SNR is therefore incremented. These and other techniques may be used in the various alternative embodiments of the invention.

Figure 6:
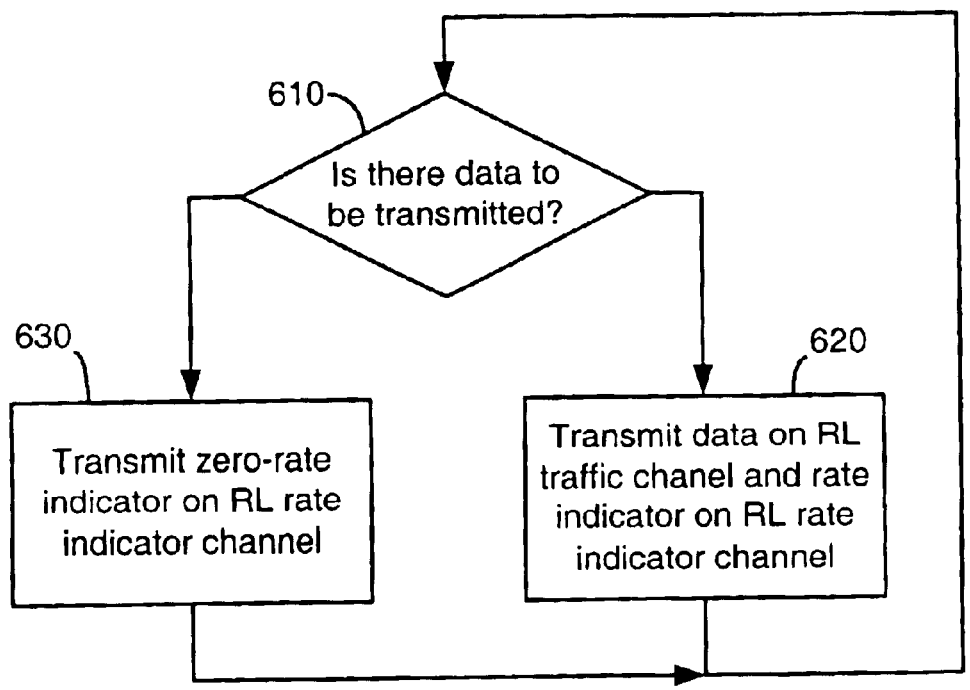
FIG. 6 is a flow diagram illustrating the operation of a mobile station in accordance with one embodiment.

Referring to FIG. 6, a flow diagram illustrating the operation of a mobile station in accordance with one embodiment of the invention is shown. In this figure, the mobile station first determines whether or not there is data to be transmitted (block 610). If there is data to be transmitted, the data may be transmitted via scheduled or autonomous transmissions, as described elsewhere in this disclosure. When the data is transmitted on the reverse-link traffic channel, a rate indicator corresponding to each sub-frame of the data on the reverse-link traffic channel is transmitted on the reverse-link rate indicator channel (block 620). If, however, there is no data to the transmitted, a zero-rate indicator is periodically transmitted on the reverse-link rate indicator channel (block 630). In one embodiment, the zero-rate indicator is transmitted during the first 5 ms of each 20 ms frame.

Figure 7:
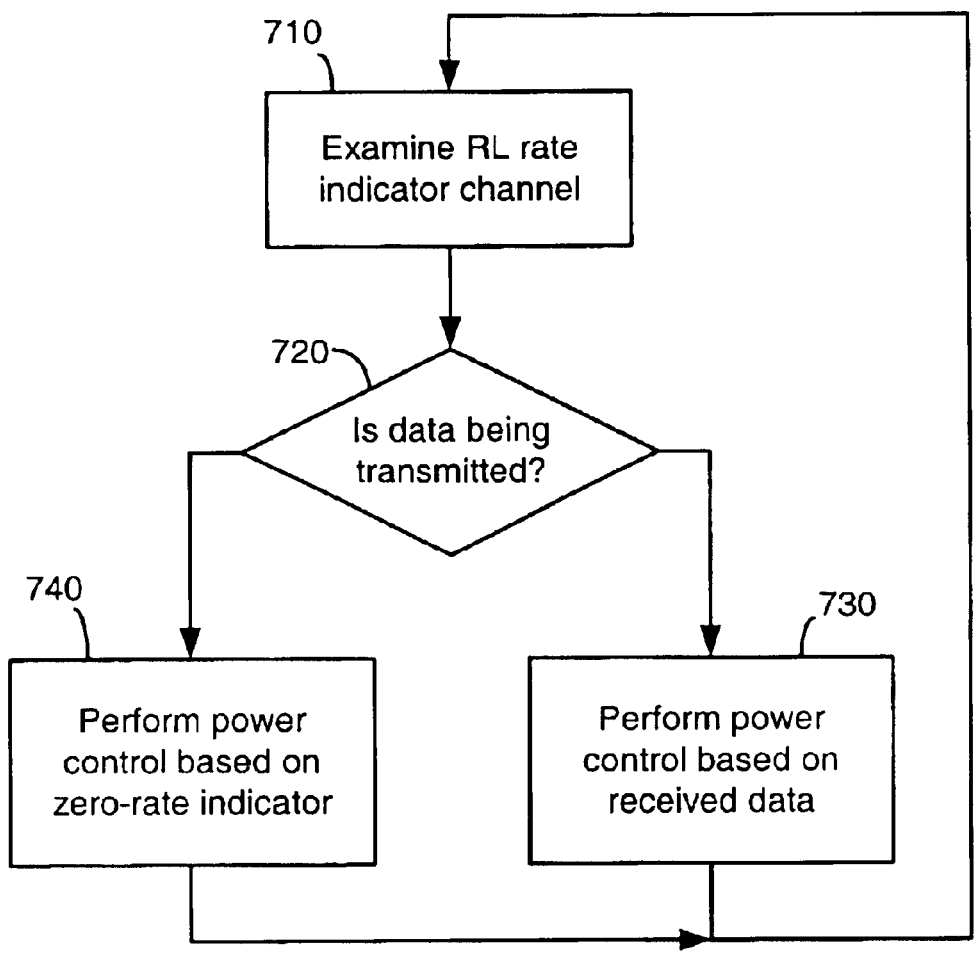
FIG. 7 is a flow diagram illustrating the operation of a base station in accordance with one embodiment.

Referring to FIG. 7, a flow diagram illustrating the operation of a base station in accordance with one embodiment of the invention shown. As depicted in FIG. 7, the base station examines the reverse-link rate indicator channel (block 710) and determines whether data is being transmitted, based upon the received rate indicator (block 720). If a non-zero rate indicator is received, the base station knows that a corresponding sub-frame was transmitted on the reverse-link traffic channel. The base station interprets the received sub-frame in accordance with the received rate indicator and adjusts the target SNR based on the presence of errors in the received data (block 730). If a zero-rate indicator is received on the reverse-link rate indicator channel, the base station knows that no data is being transmitted on the reverse-link traffic channel, so the base station performs adjusts the target SNR based upon the zero-rate indicator (block 740).

By providing the zero-rate indicator on the R-RICH, the system can perform power control operations without the need to transmit control information on R-FCH or R-DCCH. This may significantly reduce the overhead of the system. It should also be noted that the R-RICH can be used to provide additional channel estimation for the R-ESCH demodulation by using it as an additional pilot. This function may be performed at a lower power level than that used for transmission of rate indicators corresponding to R-ESCH data transmissions.

In a preferred embodiment, data transmissions on the R-ESCH may be made in either of two modes: a scheduled transmission mode; or an autonomous transmission mode. As indicated by the names of the modes, a mobile station may interact with the base station to obtain a scheduled time to transmit data over the R-ESCH, or, under certain conditions, the mobile station may autonomously initiate a transmission of data over the R-ESCH without first obtaining a scheduled transmission time.

In one embodiment, the reverse link is designed to maintain the rise-over-thermal at the base station at a relatively constant level as long as there is reverse link data to be transmitted, while still allowing mobile stations to transmit at the maximum data rate for each mobile station when possible. The design is intended to provide the required time division multiplexing gain on the reverse link and still allow mobile stations with little data to autonomously transmit their data in order to minimize delays in transmitting the data. As mentioned above, the reverse link is designed to provide these features by allowing mobile stations to transmit data on the R-ESCH in two different ways: via autonomous transmissions; and via scheduled transmissions.

Autonomous transmissions are used to transmit traffic that cannot tolerate much delay. Autonomous transmissions are used to reduce delay and controlled overhead for delay-sensitive data and are particularly useful for transmissions from mobile stations at the edge of a cell where overhead costs are high. Any time a mobile station has data to send, the mobile station can transmit the data autonomously at up to a certain transmission rate which is determined by the base station. The maximum data transmission rate is set by a maximum traffic-to-pilot ratio (T/P) that is specified by the base station during call setup. This T/P can be modified by subsequent signaling between the base station and mobile station. The maximum T/P may be different for different mobile stations, and is related to, among other things, the quality of service (QoS) requirements for the different mobile stations.

Autonomous transmission is particularly useful when it is necessary to transmit small amounts of data. Autonomous transmissions are characterized by the small delays that are experienced prior to transmission of the data (i.e., the amount of time the data must wait before it is transmitted). Autonomous transmissions use the same hybrid automatic repeat request (H-ARQ) mechanisms as scheduled transmissions. In some situations, however, mobile stations may not be able to transmit at rates to greater than the lowest rate, and it may likewise be too costly for the base station to send acknowledgments to the mobile station, so scheduled transmissions cannot be used. In these instances, autonomous transmissions may be set up by layer 3 signaling, thereby eliminating the need for the mobile stations to monitor a forward-link control channel for this purpose. In alternative embodiments, this information may be transmitted by other means, such as Handoff Direction Messages (HDMs) on traffic channels.

Scheduled transmissions are used when T/P that can be supported by the mobile station is at least one level higher than the maximum T/P set for autonomous transmissions, and the data in the mobile stations buffer is enough to fill at least one entire packet larger than is supported by the autonomous maximum T/P. In determining whether these conditions are met, the mobile station accounts for autonomous transmissions which will take place during the delay between the request for a scheduled transmission and the granting of the scheduled transmission.

If a request for a scheduled transmission is warranted, the mobile station sends the request via a 5 ms message on a request channel (e.g., R-REQCH). The request may alternatively be transmitted via a control channel (e.g., R-DDCH). The request includes four bits indicating the T/P supported by R-ESCH, four bits indicating the mobile station's queue size and four bits indicating the QoS level required for the transmission. In response to receiving the request, the base station may transmit a grant message to the mobile station. This message may convey either an individual grant or a common grant. Accordingly, the great may be transmitted via a forward grant channel (e.g., F-GCH) or a forward common grant channel (e.g., F-CGCH). The individual grant specifically grants a scheduled transmission period to the mobile station, while a common grant allows any mobile station that wishes to transmit to do so.

After transmitting a request to the base station, a mobile station is required to wait for a predetermined amount of time (the Minimum Re-Request Delay, or T_MRRD) before it can send another request for a scheduled transmission. T_MRRD is transmitted to the mobile station via layer 3 signaling. The mobile station is required to wait for this amount of time before re-requesting a grant for a scheduled transmission in order to allow recovery from lost request messages, while avoiding premature re-requests.

The base station can schedule transmissions from any requesting mobile stations. The scheduling decisions of the base station may be based on factors such as the mobile stations' soft handoff (SHO) status. The scheduling decisions may be made by the receiving base station alone, or they may be made synchronously by all base stations in the active set. The involvement of all active set members may cause a longer scheduling delay, but may also save the power required by the grant due to diversity.

The various aspects and features of the present invention have been described above with regard to specific embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for wireless communication comprising:
a base station; and
a mobile station;
wherein the base station and mobile station are configured to communicate via a plurality of wireless communication channels, including a reverse-link traffic channel and a reverse-link rate indicator channel;
wherein when the mobile station transmits traffic on the reverse-link traffic channel, the mobile station transmits a corresponding rate indicator on the reverse-link rate indicator channel and when the mobile station is not transmitting traffic on the reverse-link traffic channel, the mobile station periodically transmits a zero-rate indicator on the reverse-link rate indicator channel; and
wherein when the base station receives data on the reverse-link traffic channel, the base station performs power control based on the received data and when the base station receives no data on the reverse-link traffic channel, the base station performs power control based on the zero-rate indicator.

2. The system of claim 1, wherein the system conforms to a release of the cdma2000 specification.

3. The system of claim 2, wherein the reverse-link traffic channel comprises a reverse-link enhanced supplemental channel (R-ESCH).

4. The system of claim 2, wherein the reverse-link indicator channel comprises a reverse-link rate indicator channel (R-RICH).

5. The system of claim 1, wherein the zero-rate indicator is transmitted during a portion of each frame period, wherein the portion comprises less than all of the frame period.

6. The system of claim 5, wherein each frame comprises a plurality of sub-frames, wherein the zero-rate indicator is transmitted in one or more of the sub-frames.

7. The system of claim 6, wherein the rate indicator is transmitted in one sub-frame of each frame.

8. The system of claim 7, wherein each frame comprises a 20 ms period that is subdivided into four sub-frames of 5 ms each.

9. A mobile station operable to communicate with a base station via a wireless communication channel, wherein the mobile station comprises:
a processing subsystem; and
a transceiver subsystem coupled to the processing subsystem and configured to transmit data on a reverse link traffic channel and a reverse link rate indicator channel;

wherein the processing subsystem is configured to cause the transceiver subsystem to transmit a rate indicator signal on the reverse-link rate indicator channel when traffic is being transmitted on the reverse-link traffic channel, wherein the rate indicator signal corresponds to a rate of the traffic being transmitted on the reverse-link traffic channel, and periodically transmit a zero-rate indicator on the reverse-link rate indicator channel when traffic is not being transmitted on the reverse-link traffic channel.

10. The mobile station of claim 9, wherein the mobile station conforms to a release of the cdma2000 specification.

11. The mobile station of claim 10, wherein the reverse-link traffic channel comprises a reverse-link enhanced supplemental channel (R-ESCH).

12. The mobile station of claim 10, wherein the reverse-link indicator channel comprises a reverse-link rate indicator channel (R-RICH).

13. The mobile station of claim 9, wherein the zero-rate indicator is transmitted during a portion of each frame period, wherein the portion comprises less than all of the frame period.

14. The mobile station of claim 13, wherein each frame comprises a plurality of sub-frames, wherein the zero-rate indicator is transmitted in one or more of the sub-frames.

15. The mobile station of claim 14, wherein the rate indicator is transmitted in one sub-frame of each frame.

16. The mobile station of claim 15, wherein each frame comprises a 20 ms period that is subdivided into four sub-frames of 5 ms each.

17. A base station operable to communicate with a mobile station via a wireless communication channel, wherein the base station comprises:

a processing subsystem; and a transceiver subsystem coupled to the processing subsystem and configured to receive data on a reverse link traffic channel and a reverse link rate indicator channel;

wherein when the base station receives data on the reverse-link traffic channel, the base station performs power control based on the received data and when the base station receives no data on the reverse-link traffic channel, the base station performs power control based on the zero-rate indicator.

18. The base station of claim 17, wherein the base station conforms to a release of the cdma2000 specification.

19. The base station of claim 18, wherein the reverse-link traffic channel comprises a reverse-link enhanced supplemental channel (R-ESCH).

20. The base station of claim 18, wherein the reverse-link indicator channel comprises a reverse-link rate indicator channel (R-RICH).

21. The base station of claim 17, wherein when the base station receives data on the reverse-link traffic channel, the base station is configured to perform power control by directing a mobile station from which the data is received to increase a power level associated with the mobile station when the received data has a signal to noise ratio (SNR) below a target SNR and to decrease the power level associated with the mobile station when the received data has a SNR above the target SNR.

22. The base station of claim 17, wherein when the base station does not receive data on the reverse-link traffic channel, the base station is configured to perform power control by computing a reliability metric for the zero-rate indicator and incrementing a power level for a mobile station from which the zero-rate indicator is received when the reliability metric indicates that the zero-rate indicator is not reliable, and decrementing the power level when the reliability metric indicates that the zero-rate indicator is reliable.

23. The base station of claim 17, wherein when the base station does not receive data on the reverse-link traffic channel, the base station is configured to perform power control by computing a velocity profile for a mobile station from which the zero-rate indicator is received based upon the power of the zero-rate indicator and adjusting a power level for the mobile station based upon the computed velocity profile.

24. The base station of claim 17, wherein when the base station does not receive data on the reverse-link traffic channel, the base station is configured to perform power control by computing a power density for the zero-rate indicator and adjusting a power level for a mobile station from which the zero-rate indicator is received based upon the computed power density.

25. A method implemented in a system having a reverse-link traffic channel and a reverse-link rate indicator channel, wherein the method comprises:

when traffic is being transmitted on the reverse-link traffic channel, transmitting a rate indicator signal on the reverse-link rate indicator channel, wherein the rate indicator signal corresponds to a rate of the traffic being transmitted on the reverse-link traffic channel, and controlling a power level based on the traffic being transmitted on the reverse-link traffic channel; and when traffic is not being transmitted on the reverse-link traffic channel, periodically transmitting a zero-rate indicator on the reverse-link rate indicator channel, and controlling the power level based on the zero-rate indicator.

26. The method of claim 25, wherein the reverse-link traffic channel comprises a cdma2000 reverse-link enhanced supplemental channel (R-ESCH).

27. The method of claim 25, wherein the reverse-link indicator channel comprises a cdma2000 reverse-link rate indicator channel (R-RICH).

28. The method of claim 25, wherein the zero-rate indicator is transmitted during a portion of each frame period, wherein the portion comprises less than all of the frame period.

29. The method of claim 28, wherein each frame comprises a plurality of sub-frames, wherein the zero-rate indicator is transmitted in one or more of the sub-frames.

30. The method of claim 29, wherein the rate indicator is transmitted in one sub-frame of each frame.

31. The method of claim 30, wherein each frame comprises a 20 ms period that is subdivided into four sub-frames of 5 ms each.

32. A method implemented in a mobile station operable to communicate with a base station via a wireless communication link, wherein the method comprises:

if the mobile station has data to transmit, transmitting a rate indicator signal on a reverse-link rate indicator channel, wherein the rate indicator signal corresponds to a rate of traffic being transmitted on a reverse-link traffic channel; and if the mobile station has no data to transmit, periodically transmitting a zero-rate indicator on the reverse-link rate indicator channel.

33. The method of claim 32, wherein the reverse-link traffic channel comprises a cdma2000 reverse-link enhanced supplemental channel (R-ESCH).

34. The method of claim 32, wherein the reverse-link indicator channel comprises a cdma2000 reverse-link rate indicator channel (R-RICH).

35. The method of claim 32, wherein the zero-rate indicator is transmitted during a portion of each frame period, wherein the portion comprises less than all of the frame period.

36. The method of claim 35, wherein each frame comprises a plurality of sub-frames, wherein the zero-rate indicator is transmitted in one or more of the sub-frames.

37. The method of claim 36, wherein the rate indicator is transmitted in one sub-frame of each frame.

38. The method of claim 37, wherein each frame comprises a 20 ms period that is subdivided into four sub-frames of 5 ms each.

39. A method implemented in a base station operable to communicate with a mobile station via a wireless communication link, wherein the method comprises:
when traffic is being received on a reverse-link traffic channel,
controlling a power level based on the traffic being transmitted on the reverse-link traffic channel; and
when traffic is not being received on the reverse-link traffic channel,
receiving a periodically transmitted zero-rate indicator on a reverse-link rate indicator channel, and
controlling the power level based on the zero-rate indicator.

40. The method of claim 39, wherein the reverse-link traffic channel comprises a cdma2000 reverse-link enhanced supplemental channel (R-ESCH).

41. The method of claim 39, wherein the reverse-link indicator channel comprises a cdma2000 reverse-link rate indicator channel (R-RICH).

42. The method of claim 39, wherein controlling the power level based on the traffic being transmitted on the reverse-link traffic channel comprises directing a mobile station from which the data is received to increase a power level associated with the mobile station when the received data has a signal to noise ratio (SNR) below a target SNR and to decrease the power level associated with the mobile station when the received data has a SNR above the target SNR.

43. The method of claim 39, wherein controlling the power level based on the zero-rate indicator comprises computing a reliability metric for the zero-rate indicator and incrementing a power level for a mobile station from which the zero-rate indicator is received when the reliability metric indicates that the zero-rate indicator is not reliable, and decrementing the power level when the reliability metric indicates that the zero-rate indicator is reliable.

44. The method of claim 39, wherein controlling the power level based on the zero-rate indicator comprises computing a velocity profile for a mobile station from which the zero-rate indicator is received based upon the power of the zero-rate indicator and adjusting a power level for the mobile station based upon the computed velocity profile.

45. The method of claim 39, wherein controlling the power level based on the zero-rate indicator comprises computing a power density for the zero-rate indicator and adjusting a power level for a mobile station from which the zero-rate indicator is received based upon the computed power density.

* * * * *